United States Patent
Hagiwara et al.

(10) Patent No.: US 10,559,814 B2
(45) Date of Patent: Feb. 11, 2020

(54) NONAQUEOUS ELECTROLYTE BATTERY AND BATTERY PACK

(71) Applicants: KABUSHIKI KAISHA TOSHIBA, Minato-ku (JP); Toshiba Infrastructure Systems & Solutions Corporation, Kawasaki-shi (JP)

(72) Inventors: Asuna Hagiwara, Kashiwazaki (JP); Hidesato Saruwatari, Yokohama (JP); Dai Yamamoto, Kashiwazaki (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 16/124,880

(22) Filed: Sep. 7, 2018

(65) Prior Publication Data
US 2019/0006659 A1 Jan. 3, 2019

Related U.S. Application Data

(63) Continuation of application No. PCT/JP2017/009015, filed on Mar. 7, 2017.

(30) Foreign Application Priority Data

Mar. 7, 2016 (JP) ................. 2016-043724

(51) Int. Cl.
*H01M 4/134* (2010.01)
*H01M 4/04* (2006.01)
(Continued)

(52) U.S. Cl.
CPC ............. *H01M 4/134* (2013.01); *H01M 4/04* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2005/0221188 A1 10/2005 Takami et al.
2010/0015514 A1 1/2010 Miyagi et al.
(Continued)

FOREIGN PATENT DOCUMENTS

JP  2005-100771   4/2005
JP  2005-317512   11/2005
(Continued)

OTHER PUBLICATIONS

International Search Report dated Apr. 18, 2017 in PCT/JP2017/009015, filed on Mar. 7, 2017 (with English Translation).
(Continued)

*Primary Examiner* — Tracy M Dove
(74) *Attorney, Agent, or Firm* — Oblon, McClelland, Maier & Neustadt, L.L.P.

(57) ABSTRACT

According to one embodiment, a nonaqueous electrolyte battery includes a negative electrode and a nonaqueous electrolyte. The negative electrode includes a negative electrode active material and a binder. The negative electrode active material contains monoclinic titanium dioxide or $Li_{4+a}Ti_5O_{12}$ (here, $-0.5 \leq a \leq 3$). The binder includes polyvinylidene fluoride with a molecular weight of 400,000 to 1,000,000. The negative electrode satisfies a formula (I) below. The nonaqueous electrolyte contains at least one of difluorophosphate and monofluorophosphate.

$$0.1 \leq (P2/P1) \leq 0.4 \qquad (I)$$

7 Claims, 4 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 2013/0022861 A1 | 1/2013 | Miyagi et al. |
| 2014/0011082 A1 | 1/2014 | Yamamoto et al. |
| 2015/0243936 A1 | 8/2015 | Miyagi et al. |
| 2017/0040593 A1 | 2/2017 | Miyagi et al. |

FOREIGN PATENT DOCUMENTS

| | | |
|---|---|---|
| JP | 2007-214120 | 8/2007 |
| JP | 2009-54480 | 3/2009 |
| JP | 2010-231960 | 10/2010 |
| JP | 2013-58402 | 3/2013 |
| JP | 2014-29849 | 2/2014 |
| JP | 2015-187926 | 10/2015 |
| WO | WO 2016/017092 A1 | 2/2016 |

OTHER PUBLICATIONS

Written Opinion dated Apr. 18, 2017 in PCT/JP2017/009015, filed on Mar. 7, 2017.

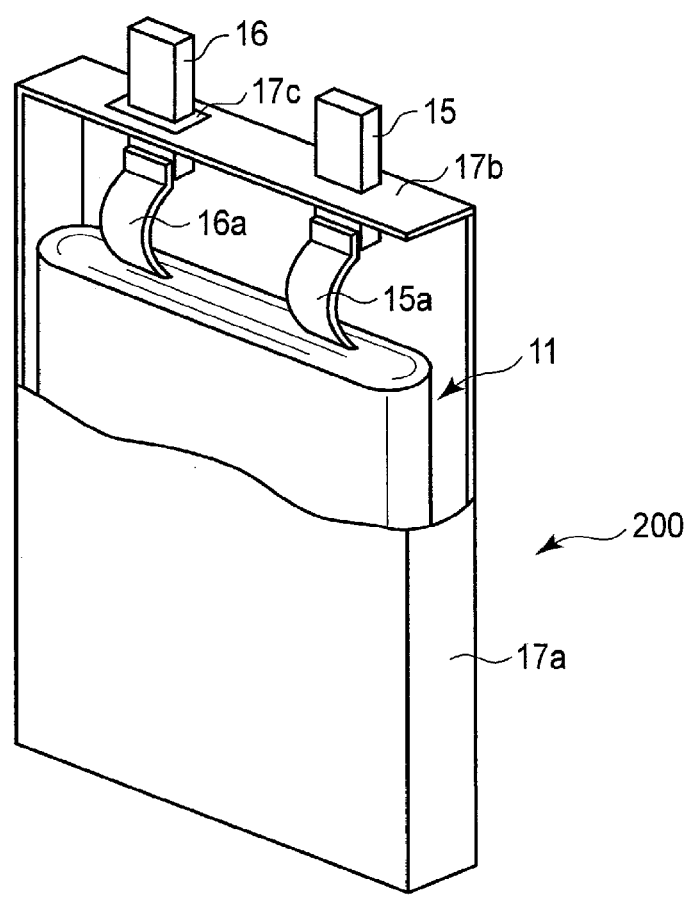
F I G. 3

NONAQUEOUS ELECTROLYTE BATTERY AND BATTERY PACK

CROSS-REFERENCE TO RELATED APPLICATIONS

This application is a Continuation Application of PCT Application No. PCT/JP2017/009015, filed Mar. 7, 2017 and based upon and claiming the benefit of priority from Japanese Patent Application No. 2016-043724, filed Mar. 7, 2016, the entire contents of all of which are incorporated herein by reference.

FIELD

Embodiments of the present invention relate to a nonaqueous electrolyte battery and a battery pack.

BACKGROUND

Lithium ion secondary batteries are widely used in portable devices, automobiles, storage batteries, and the like. In lithium ion secondary batteries containing carbon as a negative electrode active material, repetition of a charge-and-discharge cycle causes formation of lithium dendrites on the negative electrode. For this reason, degradation of battery performance, such as increase in resistance and deterioration of cycle performance, is a matter of concern in such a lithium ion secondary battery using a carbon-based negative electrode active material. To address such concerns, metal oxides to replace the above-described carbon-based materials for negative electrodes have been considered.

A negative electrode including a spinel type lithium titanate ($Li_4Ti_5O_{12}$) can suppress precipitation of lithium dendrites. It is known that the suppression can minimize risks, such as short circuit, self-discharge, and ignition, and makes it possible to manufacture batteries having excellent life performance. It is also known that a high-power battery can be achieved by increasing a specific surface area.

BRIEF DESCRIPTION OF DRAWINGS

FIG. 3 is a partially cutaway perspective view of a nonaqueous electrolyte battery according to a second example of the first embodiment.

DETAILED DESCRIPTION

Figure 1:
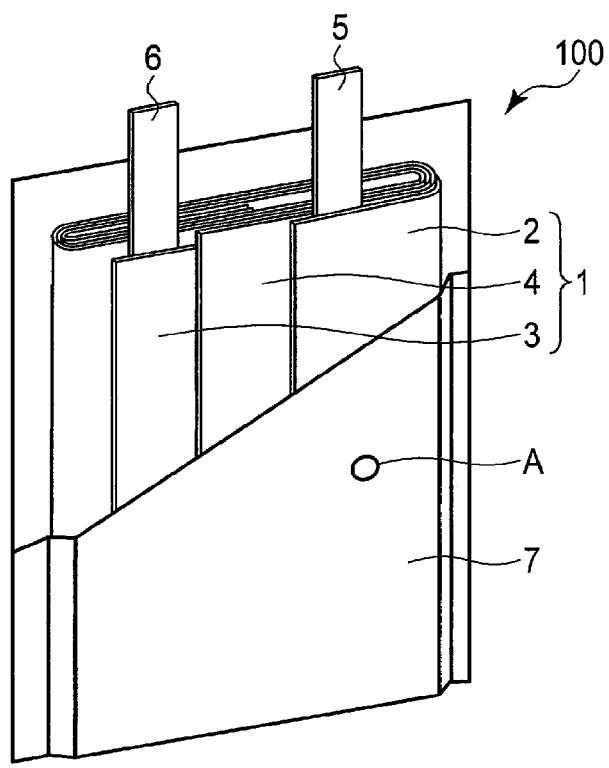
FIG. 1 is a partially cutaway perspective view of a nonaqueous electrolyte battery of a first example according to a first embodiment.

According to a first embodiment, a nonaqueous electrolyte battery is provided. The nonaqueous electrolyte battery includes a positive electrode, a negative electrode and a nonaqueous electrolyte. The negative electrode includes a negative electrode active material and a binder. The negative electrode active material contains monoclinic titanium dioxide or $Li_{4+a}Ti_5O_{12}$ (here, $-0.5 \leq a \leq 3$). The binder of the negative electrode includes polyvinylidene fluoride with a molecular weight of 400,000 to 1,000,000, inclusive. The negative electrode satisfies a formula (I) below. The nonaqueous electrolyte contains at least one of difluorophosphate and monofluorophosphate.

$$0.1 \leq (P2/P1) \leq 0.4 \quad (I),$$

wherein P1 is an intensity of a peak that appears within a range of 689 to 685 eV in a spectrum according to photoelectron spectrometry of a surface of the negative electrode, and P2 is an intensity of a peak that appears within a range of 684 to 680 eV in the spectrum.

According to a second embodiment, a battery pack is provided. The battery pack includes the nonaqueous electrolyte battery according to the first embodiment.

Embodiments will be described below with reference to the drawings. The same structures will be referenced by the same numbers and symbols throughout the embodiments, and overlapping descriptions will be omitted. Each drawing is a schematic drawing to aid understanding of the embodiments and the descriptions thereof. Shapes, dimensions, and ratios presented therein may be different from those of the actual apparatus; however, they may be appropriately changed as a design choice in consideration of the following descriptions and publicly-known techniques.

First Embodiment

According to a first embodiment, a nonaqueous electrolyte battery is provided. The nonaqueous electrolyte battery includes a positive electrode, a negative electrode, and a nonaqueous electrolyte. The negative electrode contains monoclinic titanium dioxide or $Li_{4+a}Ti_5O_{12}$ (herein, $-0.5 \leq a \leq 3$) as an active material, and polyvinylidene fluoride having a molecular weight falling within a range of 400,000 to 1,000,000 inclusive, as a binder. The nonaqueous electrolyte contains at least one of difluorophosphate and monofluorophosphate.

The negative electrode satisfies the following formula (I).

$$0.1 \leq (P2/P1) \leq 0.4 \quad (I)$$

In the formula (I), P1 is an intensity of a peak that appears within the range of 689 to 685 eV in a spectrum obtained by photoelectron spectrometry performed on the surface of the negative electrode, and P2 is an intensity of a peak that appears within the range of 684 to 680 eV in the spectrum.

In the nonaqueous electrolyte battery having the above-described structure according to the embodiment, gas generation is suppressed and battery resistance is low. In order to improve a performance of a battery including a negative electrode a titanium-containing compound such as lithium titanate, it is effective to dope the negative electrode active material with a dopant or to increase a specific surface area of the negative electrode. In particular, improvement of the performance can be expected by making a specific surface area of the negative electrode larger, in turn making a reaction area larger. However, a larger surface area of the negative electrode unfavorably increases an amount of moisture adsorbed to the negative electrode.

When the battery is used, the moisture adhered to the negative electrode is electrolyzed by an electrode reaction, and hydrogen and oxygen are thereby produced. For this reason, if a large amount of moisture remains in the negative electrode, an amount of gas (hydrogen and oxygen) produced due to the moisture adhered to the negative electrode increases during the battery operation. Battery swelling is caused by a large amount of gas produced in the battery. If a gas is present on the surface of the electrode active material, it hinders a contact between a portion where the gas is present and the nonaqueous electrolyte, thereby decreasing the electrode reaction field. As a result, the current load on the remaining electrode interface increases and the battery resistance increases.

Furthermore, moisture contained in the nonaqueous electrolyte battery reacts with a lithium compound contained in the nonaqueous electrolyte, thereby producing lithium fluoride (LiF). If LiF is present on the electrode, it interferes with insertion of lithium ions into the electrode active material; therefore, LiF present on the electrode is undesirable. Furthermore, since LiF exhibits high electric resistance, presence of LiF on the electrode is undesirable from the viewpoint of increase in electric resistance.

Moisture adsorbed to the negative electrode can be removed by drying the negative electrode when the nonaqueous electrolyte battery is manufactured. However, when the drying temperature is as low as, for example, 70° C., the moisture cannot be completely removed and remains in a large amount. In contrast, since an amount of the residual moisture in the negative electrode decreases when the drying temperature is, for example, about 100° C., an amount of gas generated decreases, but the battery resistance remarkably increases. This is assumed to occur because polyvinylidene fluoride, which is a negative electrode binder, is decomposed by high heat during the battery drying. When polyvinylidene fluoride is decomposed by high heat, it produces decomposition products such as tetrafluoroethylene copolymers and derivatives. These pyrolysis products tend to easily react with moisture; accordingly, they react with moisture that remains after removal of most moisture by high-temperature drying, and as a result, a large amount of LiF is produced. In other words, even if an amount of moisture can be reduced by high-temperature drying, a small amount of residual moisture and the pyrolysis products of polyvinylidene fluoride will cause a reaction that produces LiF. As a result, the resistance of the battery rises despite the removal of moisture.

Furthermore, in the drying at a higher temperature, for example, 120° C., the decomposition further progresses, impairing the function of polyvinylidene fluoride as a binder. In this case, the binding between the negative electrode active materials is weakened and the conductivity of the negative electrode is deteriorated; as a result, the resistance of the battery increases.

Decomposition of polyvinylidene fluoride as a binder at high temperature becomes significant when a negative electrode containing titanium oxide such as monoclinic titanium dioxide or $Li_{4+a}Ti_5O_{12}$ ($-0.5 \leq a \leq 3$) is used as the active material. It is considered that this decomposition is caused because such titanium oxide exhibits a catalytic action on the pyrolysis reaction of polyvinylidene fluoride. In addition, when the molecular weight of polyvinylidene fluoride is 1,000,000 or less, the catalytic action of the pyrolysis reaction by the titanium oxide is stimulated, and pyrolysis is accelerated.

As described above, in either case of a nonaqueous electrolyte battery obtained by using an electrode in which an excessive amount of moisture is adhered due to insufficient drying or a nonaqueous electrolyte battery in which a pyrolysis product of polyvinylidene fluoride is produced due to high-temperature drying, an excessive amount of lithium fluoride (LiF) is formed on the surface of its negative electrode. If the drying temperature is too high, the binder itself does not function; as a result, the binding of the negative electrode active materials is weakened and the resistance increases.

The negative electrode included in the nonaqueous electrolyte battery according to the embodiment includes monoclinic titanium dioxide as an active material or spinel type lithium titanate represented by a general formula $Li_{4+a}Ti_5O_{12}$ (wherein, $-0.5 \leq a \leq 3$). Also, the negative electrode contains polyvinylidene fluoride having a molecular weight between 400,000 and 1,000,000 inclusive as a binder. The electrolyte contains difluorophosphate or monofluorophosphate. Furthermore, in the spectrum obtained by photoelectron spectrometry (XPS) on the surface of the negative electrode, intensity P1 of a peak that appears within the range of 689 to 685 eV and intensity P2 of a peak that appears within the range of 684 to 680 eV exhibits the relationship $0.1 \leq (P2/P1) \leq 0.4$ (formula (I)).

In such a negative electrode, the LiF formation reaction is in a state of being suppressed.

In the above-described XPS spectrum, the peak that appears within the range of 689 to 685 eV is attributed to a C—F bond and the peak that appears within the range of 684 to 680 eV is attributed to a Li—F bond. It can be determined that a C—F bond observed on the negative electrode surface is derived from polyvinylidene fluoride as a binder. In contrast, it can be determined that a Li—F bond observed on the negative electrode surface is derived from LiF generated by the reaction between the residual moisture and the nonaqueous electrolyte or the reaction between the residual moisture and the decomposition product of polyvinylidene fluoride. In other words, when the peak intensity P2 is higher than the peak intensity P1, it can be determined that an excessive amount of moisture remains, or that a reaction occurs between decomposition products of polyvinylidene fluoride and moisture.

In the negative electrode, if P2/P1 is in the range from 0.1 to 0.4 (the above formula (I)), that indicates that the negative electrode does not contain an excessive amount of LiF. And this means that moisture has been sufficiently removed from the electrode and that decomposition products of polyvinylidene fluoride have not reacted with moisture.

Furthermore, fluorine (F) that may be present on the surface of the negative electrode includes, for example, F derived from polyvinylidene fluoride as a binder, in addition to those derived from LiF. Accordingly, it is preferable that an amount of F contained in LiF is 20% or less of an amount of F present on the negative electrode surface.

In the nonaqueous electrolyte battery according to the embodiment, the nonaqueous electrolyte contains difluorophosphate or monofluorophosphate as an additive. Difluorophosphate or monofluorophosphate reacts with water to produce a stable phosphate. Therefore, by adding an appropriate amount of difluorophosphate or monofluorophosphate to the nonaqueous electrolyte, it is possible to convert residual water after the drying process to phosphate. Thus, even if pyrolysis decomposition products of polyvinylidene fluoride are present, the formation of LiF due to reaction between the pyrolysis decomposition products and moisture can be suppressed.

In other words, even if decomposition products are generated from polyvinylidene fluoride when moisture adsorbed to the negative electrode is removed by high temperature, presence of difluorophosphate or monofluorophosphate in the nonaqueous electrolyte can prevent generation of LiF.

If the drying temperature is too low, a large amount of moisture remains regardless of presence of difluorophosphate or monofluorophosphate, and an amount of the remaining water exceeds an amount of water that is converted into phosphate. This case is not preferable as it causes generation of gas. On the other hand, too high a drying temperature is also not preferable because the function of the binder itself is impaired by pyrolysis.

In the embodiment, the negative electrode contains polyvinylidene fluoride (PVdF) having a molecular weight of 400,000 to 1,000,000 as a binder. If the molecular weight is less than 400,000, the binding property of the binder is weak, and the binder is therefore weak to heat applied during the drying process; as a result, the decomposition of the binder becomes significant. If the molecular weight exceeds 1,000,000, the binder exhibits strong resistance to pyrolysis and a high binding effect as a binder; however, the binder itself becomes a resistive component because of its high molecular weight. Polyvinylidene fluoride (PVdF) as a binder preferably has a molecular weight of 700,000 or less.

Furthermore, supposing the weight of the negative electrode mixture layer to be 100 parts by weight, the mixing ratio of polyvinylidene fluoride (PVdF) contained as a binder in the negative electrode is preferably 5 parts by weight or less. If the mixing ratio of polyvinylidene fluoride (PVdF) exceeds 5 parts by weight, the electric resistance of the negative electrode may increase.

For example, when polyvinylidene fluoride (PVdF) having a molecular weight in the range from 400,000 to 1,000,000 is dried at 100° C., decomposition products may be produced while moisture is being reduced, but the formation of LiF can be prevented since difluorophosphate or monofluorophosphate is included in the nonaqueous electrolyte.

If, for example, lithium difluorophosphate ($LiPO_2F_2$) is added to the nonaqueous electrolyte, one molecule of lithium difluorophosphate reacts with two molecules of water, and one molecule of lithium phosphate ($Li_3PO_4$), which is a stable compound, is produced. For example, if lithium monofluorophosphate ($Li_2PO_3F$) is added, one molecule of lithium monofluorophosphate reacts with one molecule of water, and one molecule of lithium phosphate ($Li_3PO_4$), which is a stable compound, is produced.

If at least one of difluorophosphate and monofluorophosphate is included, it is desirable to add either one of or both of difluorophosphate and monofluorophosphate to the nonaqueous electrolyte at a mass ratio in the range from 1000 ppm to 30,000 ppm. If the added amount is less than 1000 ppm, the proportion of the additive to moisture remaining after drying is small; thus, there is a concern that generation of gas cannot be suppressed. On the other hand, even if an amount exceeding 30,000 ppm is added, improvement in effect cannot be expected. Difluorophosphate, which is a solid, needs to be dissolved in the nonaqueous electrolyte, and it is difficult to add a large amount of difluorophosphate.

The temperature to dry the negative electrode is preferably in the range from 90° C. to 110° C. When the temperature for drying is lower than 90° C., an amount of residual water adhered to the electrode increases, resulting in an increase in an amount of gas generated. If an amount of difluorophosphate or monofluorophosphate to be added to the nonaqueous electrolyte is increased in order to deal with an increased amount of residual water, difluorophosphate and monofluorophosphate that cannot be completely dissolved in the nonaqueous electrolyte in the battery would be present in the nonaqueous electrolyte; as a result, the solution resistance increases and the battery resistance increases. On the other hand, when the temperature for drying the negative electrode exceeds 110° C., polyvinylidene fluoride as a binder is thermally decomposed, resulting in an increase in battery resistance.

A duration for drying is preferably in the range from 24 hours to 70 hours. If a duration of drying is less than 24 hours, the reel drying becomes insufficient and an amount of generated gas increases. If a duration for drying exceeds 70 hours, polyvinylidene fluoride as a binder is thermally decomposed, resulting in an increase in battery resistance.

Drying of the negative electrode can be carried out under an inert gas atmosphere such as argon (Ar) or nitrogen ($N_2$), or under vacuum conditions. Drying under vacuum conditions is more preferable.

In the nonaqueous electrolyte battery according to the embodiment, an amount of gas generated due to moisture adhered to the electrode is suppressed, and pyrolysis of polyvinylidene fluoride as the negative electrode binder is suppressed. Furthermore, reaction between the decomposition products of polyvinylidene fluoride and residual moisture is suppressed. Therefore, with such a nonaqueous electrolyte battery, it is possible suppress an amount of gas generated while keeping a resistance low.

Next, the nonaqueous electrolyte battery according to the first embodiment will be described in more detail.

The nonaqueous electrolyte battery according to the first embodiment includes a negative electrode, a positive electrode, and a nonaqueous electrolyte.

The negative electrode may include a negative electrode current collector and a negative electrode mixture layer formed on the negative electrode current collector.

The negative electrode current collector may include a portion that is not provided with the negative-electrode mixture layer on its surface. This portion can act as a negative electrode tab. Alternatively, the negative electrode may further include a negative electrode tab which is provided separately from the negative electrode current collector.

The negative electrode mixture layer contains the above-described titanium oxide as a negative electrode active material. Further, the negative electrode mixture layer contains the above-described binder. The negative-electrode mixture layer may further contain a conductive agent, as needed.

The positive electrode may include a positive electrode current collector and a positive electrode material layer formed on the positive electrode current collector.

The positive electrode current collector may include a portion that is not provided with the positive-electrode mixture layer on its surface. This portion can act as a positive electrode tab. Alternatively, the positive electrode may further include a positive electrode tab which is provided separately from the positive electrode current collector.

The positive electrode mixture layer contains a positive electrode active material. The positive electrode mixture layer may further contain a conductive agent and a binder, as needed.

The positive electrode and the negative electrode can constitute an electrode group. For example, in the electrode group, the positive-electrode mixture layer and the negative-electrode mixture layer can face each other with a separator interposed therebetween. The structure of the electrode group is not particularly limited, and various structures can be adopted. For example, the electrode group can have a stack-type structure. An electrode group of the stack-type structure can be obtained, for example, by laminating positive electrodes and negative electrodes with separators, each of the separator sandwiched between the positive-electrode mixture layer and the negative-electrode mixture layer. Alternatively, the electrode group can have a winding-type structure, for example. For example, an electrode group of the winding-type structure is obtained by laminating one separator, one positive electrode, another separator, and one negative electrode in this order to form a laminate, and by winding this laminate so that the outermost layer becomes a negative electrode.

The nonaqueous electrolyte battery may further include a negative electrode terminal and a positive electrode terminal. A part of the negative electrode terminal is electrically connected to a part of the negative electrode, so that the negative electrode terminal can act as a conductor that allows electrons to move between the negative electrode and an external terminal. The negative electrode terminal can be connected to, for example, the negative electrode current collector, particularly the negative electrode tab.

Similarly, by electrically connecting a part of the positive electrode terminal to a part of the positive electrode, the positive electrode terminal can act as a conductor that allows electrons to move between the positive electrode and an external circuit. The positive electrode terminal can be connected to, for example, the positive electrode current collector, particularly the positive electrode tab.

The nonaqueous electrolyte battery according to the first embodiment may further include a container member. The container member can house the electrode group and the nonaqueous electrolyte. In the container member, the electrode group may be impregnated with the nonaqueous electrolyte. A part of each of the positive electrode terminal and the negative electrode terminal can be extended from the container member.

Hereinafter, the negative electrode, the positive electrode, the nonaqueous electrolyte, the separator, the positive electrode terminal, the negative electrode terminal, and the container member will be described in more detail.

(1) Negative Electrode

As the negative electrode current collector, a sheet containing a material having high electric conductivity can be used. For example, aluminum foil or aluminum alloy foil can be used as the negative electrode current collector. When aluminum foil or aluminum alloy foil is used, its thickness is preferably 20 μm or less. The aluminum alloy foil may contain magnesium, zinc, silicon, or the like. A content of a transition metal contained in the aluminum foil or aluminum alloy foil, such as iron, copper, nickel, chromium or the like, is preferably 1% or less with respect to the aluminum foil or aluminum alloy foil.

The titanium oxide included in the negative electrode includes at least one of a lithium-titanium composite oxide having a spinel type structure ($Li_{4+a}Ti_5O_{12}$ (the subscript "a" varies in the range from 0 to 3 depending on a charge/discharge state of the battery) and monoclinic type titanium dioxide ($Li_xTiO_2$ (B) (the subscript "x" varies in the range from 0 to 1 depending on the charge/discharge state)). It is more preferable that the titanium oxide is a lithium-titanium composite oxide having a spinel type structure. In addition to the above, the titanium oxide further includes preferably lithium titanate ($Li_{2+x}Ti_3O_7$ (the subscript "x" varies in the range from 0 to 2 depending on the charge/discharge state) having a ramsdellite type structure) and monoclinic type niobium titanium composite oxide (for example, $Li_xNb_2TiO_7$ (the subscript "x" varies in the range from 0 to 4 depending on the charge/discharge state)), and the like.

The titanium oxide can be contained in the negative electrode mixture layer as negative electrode active material particles containing titanium oxide. An average diameter of primary particles of the negative electrode active material particles is preferably 5 μm or less. When the average diameter of primary particles is 5 μm or less, it is possible to provide a sufficiently sized effective area contributing to the electrode reaction, thereby obtaining a good large-current discharge performance in the nonaqueous electrolyte battery.

The pore volume of the negative electrode is preferably in the range from 0.1 mL/g to 0.4 mL/g. If the pore volume is 0.1 mL/g or greater, a size of the effective area contributing to the electrode reaction is sufficient, and a good large-current discharge performance can be thereby obtained in the nonaqueous electrolyte battery. On the other hand, if the pore volume exceeds 0.4 mL/g, an amount of moisture adhered to the negative electrode increases. On the other hand, if it is 0.4 mL/g or less, reaction with the nonaqueous electrolyte is suppressed. Therefore, by setting the pore volume to 0.4 mL/g or less, it is possible to suppress generation of gas during storage and degradation of charge/discharge efficiency. The pore volume of the negative electrode can be determined by the mercury intrusion porosimetry method (mercury porosimetry).

A negative electrode conductive agent is used as needed in order to enhance the current collection performance. The negative electrode conductive agent is, for example, a carbon material. It is preferable that the carbon material has a high absorption property of an alkali metal and conductivity. The carbon material is, for example, acetylene black, carbon black, or graphite.

The binder in the negative electrode is used for binding the negative electrode active material particles with the negative electrode current collector. In addition to the above-described polyvinylidene fluoride (PVdF) having a molecular weight falling within a range from 400,000 to 1,000,000, the binder may contain, for example, polytetrafluoroethylene (PTFE), polyvinylidene fluoride (of a different molecular weight), fluorine type rubber, styrene-butadiene rubber (SBR), polypropylene (PP), polyethylene (PE), or carboxymethylcellulose (CMC).

The proportions of the negative electrode active material, the negative electrode conductive agent, and the binder included in the negative electrode mixture layer are preferably 70 to 95% by weight, 0 to 25% by weight, and 2 to 10% by weight, respectively.

The negative electrode can be formed by the following procedure as an example. First, a slurry is prepared by introducing a negative electrode active material, a conductive agent, and a binder to an appropriate solvent such as N-methylpyrrolidone. This slurry is applied to the surface of the negative electrode current collector, and the coating layer is dried. The slurry may be applied only to one surface of the negative electrode current collector. Alternatively, the slurry may be applied to both surfaces of one surface of the negative electrode current collector and the opposite surface thereof. The dried coating layer is pressed into a negative electrode mixture layer having a desired density, thereby achieving the negative electrode.

(2) Positive Electrode

As the positive electrode current collector, a sheet containing a material having high electric conductivity can be used. For example, aluminum foil or aluminum alloy foil can be used as the positive electrode current collector. When aluminum foil or aluminum alloy foil is used, its thickness is preferably 20 μm or less. The aluminum alloy foil may contain magnesium, zinc, silicon, or the like. A content of a transition metal contained in the aluminum alloy foil, such as iron, copper, nickel, chromium or the like, is preferably 1% or less with respect to the aluminum alloy foil.

The positive electrode mixture layer may contain at least one kind of positive electrode active material having a capacity per active material weight in the range from 10 mAh/g to 150 mAh/g in the range from 3.0 V to 3.9 V (vs Li/Li$^+$) with respect to oxidation-reduction potential of lithium metal. Such a positive electrode active material is, for example, a lithium nickel composite oxide (for example, LiNiO$_2$), a lithium cobalt composite oxide (LiCoO$_2$), a lithium nickel cobalt composite oxide (for example, LiNi$_{1-x}$Co$_x$O$_2$, 0<x<1), a lithium nickel cobalt manganese composite oxide (for example, LiNi$_{1-x-y}$Co$_x$Mn$_y$O$_2$, 0<x<1, 0<y<1, 0<x+y<1), lithium manganese cobalt composite oxide (for example, LiMn$_x$Co$_{1-x}$O$_2$, 0<x<1), or lithium iron phosphate (LiFePO$_4$).

The positive electrode conductive agent is used as needed in order to enhance the current collection performance. The positive electrode conductive agent is, for example, acetylene black, carbon black, or graphite.

The binder in the positive electrode is used for binding the positive electrode active material with the positive electrode current collector. Examples of the binder which can be included in the positive electrode include polytetrafluoroethylene (PTFE), polyvinylidene fluoride (PVdF), fluorine rubber, styrene-butadiene rubber (SBR), polypropylene (PP), polyethylene (PE), and carboxymethyl cellulose (CMC).

The proportions of the positive electrode active material, the positive electrode conductive agent, and the binder included in the positive electrode mixture layer are preferably 80 to 95% by weight, 3 to 20% by weight, and 2 to 7% by weight, respectively.

The positive electrode can be formed by the following procedure as an example. First, a slurry is prepared by introducing a positive electrode active material, a conductive agent, and a binder to an appropriate solvent such as N-methylpyrrolidone. This slurry is applied to the surface of the positive electrode current collector, and the coating layer is dried. The slurry may be applied only to one surface of the positive electrode current collector. Alternatively, the slurry may be applied to both surfaces of one surface of the negative electrode current collector and the opposite surface thereof. The dried coating layer is pressed into a positive electrode mixture layer having a desired density, thereby achieving the positive electrode.

(3) Separator

The separator is made of an insulating material, and is capable of preventing an electrical contact between the positive electrode and the negative electrode. Preferably, the separator is made of a material through which the nonaqueous electrolyte can pass, or has a shape that allows the nonaqueous electrolyte to pass through. The separator is, for example, a synthetic resin nonwoven fabric, a polyolefin porous film such as a porous polyethylene film and a polypropylene porous film, or a cellulose-based separator. A separator formed by combining these materials, for example, a separator made of a polyolefin porous film and cellulose, can also be used.

It is preferable that the separator includes pores having a diameter in the range from 10 μm to 100 μm. The thickness of the separator is preferably in the range from 2 μm to 30 μm.

(4) Nonaqueous Electrolyte

The nonaqueous electrolyte contains, for example, a nonaqueous solvent, an electrolyte dissolved in the nonaqueous solvent, and an additive.

The nonaqueous solvent may be a known nonaqueous solvent used for a nonaqueous electrolyte battery. A first example of a nonaqueous solvent is a cyclic carbonate, such as ethylene carbonate (EC) and propylene carbonate (PC). A second example of a nonaqueous solvent is: a chain carbonate such as dimethyl carbonate (DMC), methylethyl carbonate (MEC) and diethyl carbonate (DEC); γ-butyrolactone (γ-BL); acetonitrile; methyl propionate; ethyl propionate; cyclic ethers such as tetrahydrofuran (THF) and 2-methyltetrahydrofuran; and chain ethers such as dimethoxyethane and diethoxyethane. A solvent of the second example generally has low viscosity compared to a solvent of the first example. The nonaqueous solvent may be a mixed solvent of a solvent of the first example and a solvent of the second example.

The electrolyte is, for example, an alkaline salt, preferably a lithium salt. It is preferable that the electrolyte contains at least one lithium salt having an anion Van der Waals ionic radius in the range from 0.25 nm to 0.4 nm. Such a lithium salt is, for example, lithium hexafluorophosphate (LiPF$_6$), lithium arsenic hexafluoride (LiAsF$_6$), or lithium trifluoromethanesulfonate (LiCF$_3$SO$_3$). Preferably, the electrolyte is lithium hexafluorophosphate (LiPF$_6$). The concentration of the electrolyte in the nonaqueous electrolyte is preferably in the range from 0.5 mol/L to 2 mol/L.

The additive included in the nonaqueous electrolyte contains at least one of difluorophosphate and monofluorophosphate. Difluorophosphate includes, for example, lithium difluorophosphate, sodium difluorophosphate, potassium difluorophosphate. Monofluorophosphate includes, for example, lithium monofluorophosphate, sodium monofluorophosphate, potassium monofluorophosphate. The additive may include lithium fluorosulfonate, lithium bisborate, lithium nitrate, lithium acetate, or lithium propionate, instead of difluorophosphate or monofluorophosphate. Similarly to the case of adding difluorophosphate, moisture remaining in the battery can be converted to a stable compound by adding these additives to the nonaqueous electrolyte.

(5) Negative Electrode Terminal and Positive Electrode Terminal

It is preferable that the negative electrode terminal and the positive electrode terminal are made of a material having high electric conductivity. It is preferable that the terminals are made of the same material as the current collectors to reduce the contact resistance when these terminals are connected to the current collectors.

(6) Container Member

For example, a metallic container or a container made of a laminated film can be used as a container member, but is not limited thereto.

By using a metallic container as a container member, a nonaqueous electrolyte battery which has excellent impact resistance and long-term reliability can be realized. By using a container made of a laminated film as a container member, a nonaqueous electrolyte battery which has excellent corrosion resistance and a light-weighted nonaqueous electrolyte battery can be realized.

As a metallic container, for example, one having a plate thickness in the range of 0.2 mm to 5 mm can be used. The plate thickness of this metal container is more preferably 0.5 mm or less.

It is preferable that the metallic container contains at least one metallic element selected from the group consisting of Fe, Ni, Cu, Sn, and Al. A metallic container can be made of, for example, aluminum or an aluminum alloy. The aluminum alloy containing at least one element such as magnesium, zinc, silicon or the like is desirable. If the alloy contains a transition metal such as iron, copper, nickel, chromium or the like, its content is preferably 1% by weight or less. Thus, long-term reliability and impact resistance under a high-temperature environment can be remarkably improved.

As a container made of a laminated film, for example, one having a thickness in the range of 0.1 to 2 mm can be used. The thickness of this laminated film is more preferably 0.2 mm or less.

The laminated film is composed of a multilayer film including, for example, a metal layer, with resin layers sandwiching the metal layer. It is preferable that the metal layer contains at least one metallic element selected from the group consisting of Fe, Ni, Cu, Sn and Al. The metal layer is preferably an aluminum foil or an aluminum alloy foil to reduce a weight thereof. As the resin layer, for example, a polymeric material such as polypropylene (PP), polyethylene (PE), nylon or polyethylene terephthalate (PET) can be used. The laminated film can be formed into a shape of a container member by performing a heat sealing.

As a shape of the container member, a flat shape (thin shape), a square shape, a cylindrical shape, a coin shape, a button shape and the like are given as examples. Various dimensions can be adopted for the container member depending on how the battery is used. For example, when the nonaqueous electrolyte battery according to the first embodiment is used for a portable electronic device, the exterior material can be made compact according to the size of the electronic device on which the battery is mounted. Alternatively, if the nonaqueous electrolyte battery is mounted on a two-wheeled or four-wheeled motor vehicle, the container may be a container for a large-sized battery.

Next, an example of the nonaqueous electrolyte battery according to the embodiment will be described in more detail with reference to the drawings.

Figure 2:
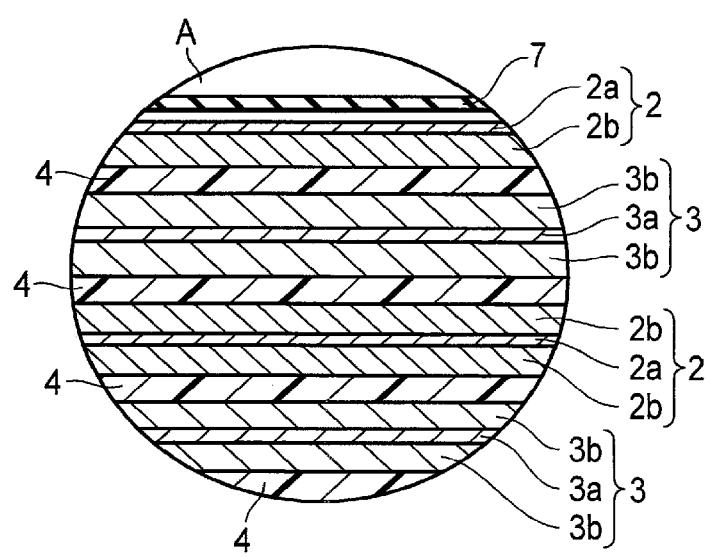
FIG. 2 is an enlarged sectional view of a portion A in FIG. 1.

FIG. 1 is a partially cutaway perspective view of a nonaqueous electrolyte battery according to a first example of the embodiment. FIG. 2 is an enlarged sectional view of a portion A of the nonaqueous electrolyte battery shown in FIG. 1.

The nonaqueous electrolyte battery 100 shown in FIGS. 1 and 2 includes a flattened electrode group 1.

The flattened electrode group 1 includes a negative electrode 2, a positive electrode 3, and a separator 4.

As shown in FIG. 2, the negative electrode 2 includes a negative electrode current collector 2a and a negative electrode mixture layer 2b carried on the negative electrode current collector 2a. As shown in FIG. 2, the positive electrode 3 includes a positive electrode current collector 3a and a positive electrode mixture layer 3b carried on the positive electrode current collector 3a.

As shown in FIG. 1, the electrode group 1 has a structure in which a negative electrode 2 and a positive electrode 3 are spirally wound so as to have a flat shape with a separator 4 interposed therebetween.

As shown in FIG. 1, in the nonaqueous electrolyte battery 100, a belt-shaped negative electrode terminal 5 is electrically connected to the negative electrode 2. More specifically, the negative electrode terminal 5 is connected to the negative electrode current collector 2a. A belt-shaped positive electrode terminal 6 is electrically connected to the positive electrode 3. More specifically, the positive electrode terminal 6 is connected to the positive electrode current collector 3a.

The nonaqueous electrolyte battery 100 further includes an outer container 7 made of a laminated film as a container. That is, the nonaqueous electrolyte battery 100 includes a container member composed of the outer container 7 made of a laminated film.

The electrode group 1 is accommodated in the outer container 7 made of a laminated film; however, the terminals of the negative electrode terminal 5 and the positive electrode terminal 6 extend from the outer container 7. A nonaqueous electrolyte (not shown) is accommodated in the outer container 7 made of a laminated film. The nonaqueous electrolyte is impregnated in the electrode group 1. The outer container 7 is sealed by heat at its peripheral portion, whereby the electrode group 1 and the nonaqueous electrolyte are sealed.

Next, a second example of the nonaqueous electrolyte battery according to the first embodiment will be described in detail with reference to FIG. 3.

FIG. 3 is a partially cutaway perspective view of a nonaqueous electrolyte battery according to a second example of the first embodiment.

The nonaqueous electrolyte battery 200 shown in FIG. 3 is different from the nonaqueous electrolyte battery 100 of the first example in that the container member is composed of a metallic container 17a and a sealing plate 17b in the battery 200.

Like the electrode group 1 in the nonaqueous electrolyte battery 100 of the first example, the flat electrode group 11 includes a negative electrode 2, a positive electrode 3, and a separator 4. The electrode group 11 has a structure similar to that of the electrode group 1. However, in the electrode group 11, the negative electrode tab 15 and the positive electrode tab 16 are connected to the negative electrode 2 and the positive electrode 3, instead of the negative electrode terminal 5 and the positive electrode terminal 6, as described later.

In the nonaqueous electrolyte battery 200 shown in FIG. 3, such an electrode group 11 is accommodated in a metallic container 17a. The metal container 17a further accommodates a nonaqueous electrolyte. The metallic container 17a is sealed by the sealing plate 17b made of a metal. The metallic container 17a and the sealing plate 17b constitute a packaging can as a container member, for example.

One end of the negative electrode tab 15a is electrically connected to the negative electrode current collector 2a and the other end is electrically connected to the negative electrode terminal 15. One end of the positive electrode tab 16a is electrically connected to the positive electrode current collector 3a and the other end is electrically connected to the positive electrode terminal 16 fixed to the sealing plate 17b. The positive electrode terminal 16 is fixed to the sealing plate 17b with an insulating member 17c. The positive electrode terminal 16 and the sealing plate 17b are electrically insulated by the insulating member 17c.

(Photoelectron Spectrometry Measurement)

Regarding the negative electrode, the aforementioned P2/P1, F present on the negative electrode surface, and a proportion of F belonging to LiF can be obtained by X-ray photoelectron spectrometry (XPS) measurement.

A measurement sample used for XPS measurement is prepared as follows.

First, a battery including a negative electrode to be measured is brought into a discharge state and disassembled in a glove box under an atmosphere of an inert gas such as argon (Ar). Constant current discharging is performed at 1 C until a lower limit of an operating voltage range is reached so that the battery charging rate becomes 0%, and constant voltage discharging is further performed until the current value reaches 0.2 C. A lower limit value of the operating voltage is, for example, 1.5 V.

Within a glove box, the negative electrode is taken out from the battery. The removed negative electrode is washed with ethyl methyl carbonate. Washing should be completed within 5 seconds to prevent the LiF on the negative electrode from being washed off during washing with ethyl methyl carbonate. Thereafter, the negative electrode is air-dried, thereby obtaining a measurement sample.

The measurement sample is mounted on the XPS stage under an inert atmosphere. For example, disassembly of the battery, removal of the negative electrode, washing and drying of the negative electrode, and mounting of the measurement sample to the XPS stage are all performed within the glove box. The measurement sample mounted on the XPS stage is introduced into the XPS measurement apparatus with the inert atmosphere maintained.

The XPS measurement apparatus is not particularly limited, but for example, VG Theta Probe manufactured by Thermo Fisher Scientific Inc. can be used. An example of the measurement conditions is as follows: irradiation X-ray: single crystal spectral AlKα, X-ray spot diameter: 800×400 µm, information depth: 6 to 7 nm.

Survey scan measurement (qualitative analysis) and narrow scan measurement (state measurement) of an element of interest are performed on the electrode surface with respect to the measurement sample introduced into the XPS measurement apparatus. Herein, to find out about LiF on the surface of the negative electrode in detail, F is an element of interest in the narrow scan measurement.

Fitting is appropriately performed on the XPS spectrum obtained by the measurement as described above, in such a manner that two peaks will appear. Of the two peaks that appear, the peak that appears within the range of 689 to 685 eV is attributed to a C—F bond and the peak that appears within the range of 684 to 680 eV is attributed to a Li—F bond. Defining the former peak intensity as P1 and the latter peak intensity as P2, P2/P1 is calculated.

Then, an area of each of the peaks is calculated, and a ratio of the area of the peak attributed to the Li—F bond is calculated, thereby estimating an amount of LiF on the negative electrode surface. Specifically, a sum of the two peak areas corresponds to all F present on the negative electrode surface, and the area of the peak attributed to the Li—F bond corresponds to LiF present on the negative electrode surface. Therefore, the proportion of F contained in LiF among F on the negative electrode surface can be determined based on the ratio of the area of the peak attributed to the Li—F bond to the total area of the two peaks.

(Capillary Electrophoresis)

An amount of difluorophosphate or monofluorophosphate contained in each nonaqueous electrolyte battery can be determined by capillary electrophoresis.

A nonaqueous electrolyte collected from a battery which has been discharged and disassembled in the glove box under an inert gas atmosphere as described above is used as the measurement sample.

By detecting difluorophosphate or monofluorophosphate or both salts contained in the measurement sample by electrophoresis, an amount of difluorophosphate or monofluorophosphate, or both contained in the nonaqueous electrolyte battery can be calculated.

An example of electrophoresis conditions is as follows: capillary: internal diameter 50 µm, length 72 cm, applied voltage: −30 kV, temperature: 15° C., running buffer: buffer for inorganic anion analysis manufactured by Agilent Technologies, detection wavelength: Signal=350 (±80) nm, ref=245 (±10) nm (indirect absorbance method), measurement time: 15 minutes.

A buffer for inorganic anion analysis manufactured by Agilent Technologies is composed of water, sodium hydroxide, 1,2,4,5-benzenetetracarboxylic acids, triethanolamine, hexamethonium bromide.

The nonaqueous electrolyte battery according to the first embodiment includes a negative electrode, a positive electrode, and a nonaqueous electrolyte. The negative electrode contains monoclinic titanium dioxide or $Li_{4+a}Ti_5O_{12}$ (herein, $-0.5 \leq a \leq 3$) as an active material, and polyvinylidene fluoride having a molecular weight in the range from 400,000 to 1,000,000 as a binder. The nonaqueous electrolyte contains at least one of difluorophosphate and monofluorophosphate. When an intensity of a peak that appears within the range of 689 to 685 eV is P1 and an intensity of a peak that appears within the range of 684 to 680 eV is P2 in a spectrum obtained by photoelectron spectrometry on the surface of the negative electrode, the negative electrode satisfies the relationship $0.1 \leq (P2/P1) \leq 0.4$.

With such a structure, in the nonaqueous electrolyte battery according to the first embodiment, generation of gas is suppressed and the resistance is low.

Second Embodiment

According to the second embodiment, a battery pack is provided. The battery pack includes a nonaqueous electrolyte battery according to the first embodiment.

The battery pack according to the second embodiment may include nonaqueous electrolyte batteries. The nonaqueous electrolyte batteries can be electrically connected in series or in parallel. Alternatively, the nonaqueous electrolyte batteries can be connected both in series and in parallel.

For example, the battery pack according to the second embodiment may be provided with five nonaqueous electrolyte batteries according to the first embodiment. These nonaqueous electrolyte batteries can be connected in series. The nonaqueous electrolyte batteries connected in series can constitute a battery module. In other words, the battery pack according to the second embodiment may include a battery module.

The battery pack according to the second embodiment may include battery modules. The battery modules can be connected in series, in parallel, or both in series and in parallel.

Hereinafter, an example of a battery pack according to the second embodiment will be described with reference to FIGS. 4 and 5.

Figure 4:
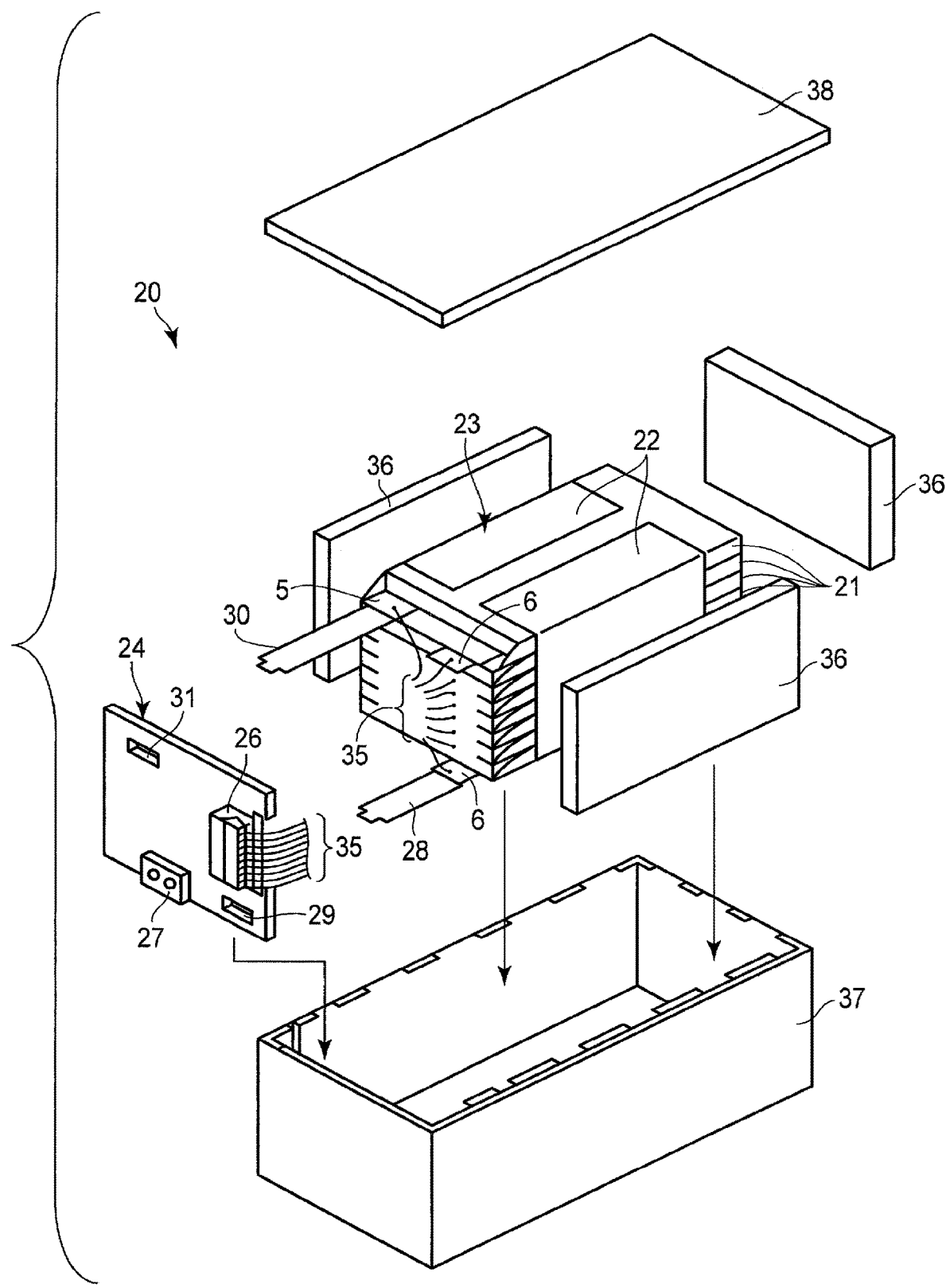
FIG. 4 is an exploded perspective view of a battery pack as one example according to a second embodiment.

FIG. 4 is an exploded perspective view of a battery pack as one example according to the second embodiment. FIG. 5 is a block diagram showing an electric circuit of the battery pack shown in FIG. 4.

Figure 5:
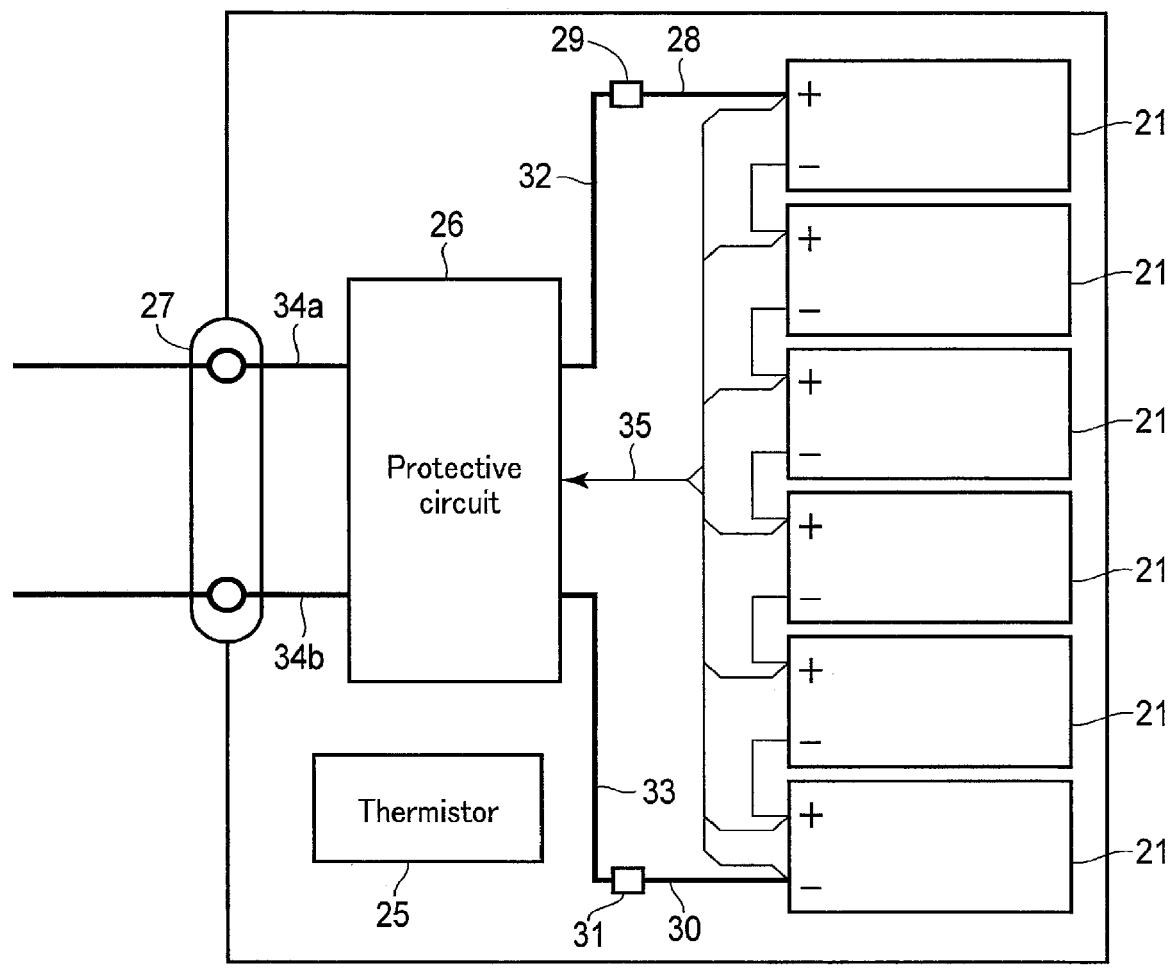
FIG. 5 is a block diagram showing an electric circuit of the battery pack shown in FIG. 4.

The battery pack 20 shown in FIGS. 4 and 5 includes single batteries 21. The single battery 21 may be the flat nonaqueous electrolyte battery 100 as one example according to the first embodiment above-described with reference to FIG. 3.

The single batteries 21 are stacked such that negative electrode terminals 5 and positive electrode terminals 6 extending to the outside are aligned in the same direction, and are fastened with each other by an adhesive tape 22 to constitute a battery module 23. As shown in FIG. 5, these single batteries 21 are electrically connected to each other in series.

A printed wiring board 24 is arranged to face a side surface of the single batteries 21 from which the negative electrode terminals 5 and positive electrode terminals 6 of the single batteries 21 extend. As shown in FIG. 5, a thermistor 25, a protective circuit 26 and as an external terminal for distributing power a power distributing terminal 27 for external devices are mounted on the printed wiring board 24. In the printed wiring board 24, an electrical insulating plate (not shown) is mounted on a surface facing the battery module 23 to avoid undesirable contact with wiring of the battery module 23.

A positive electrode lead 28 is connected to the positive electrode terminal 6 located in a lowest layer of the battery module 23, and the tip end thereof is inserted into a connector 29 on the positive electrode side of the printed wiring board 24 and is electrically connected thereto. A negative electrode lead 30 is connected to the negative electrode terminal 5 located in a topmost layer of the battery module 23, and the tip end thereof is inserted into a connector 31 on the negative electrode side of the printed wiring board 24 and is electrically connected thereto. These connectors 29 and 31 are connected to the protective circuit 26 through wires 32 and 33 formed on the printed wiring board 24.

The thermistor 25 detects a temperature of each single battery 21 and a detection signal corresponding to the temperature is sent to the protective circuit 26. Under predetermined conditions, the protective circuit 26 can cut off plus-side wiring 34a and minus-side wiring 34b between the protective circuit 26 and the power distributing 27 to external devices. One of the predetermined conditions is, for example, when a temperature detected by the thermistor 25 is equal to or higher than a predetermined temperature. Another example of the predetermined conditions is when overcharging, overdischarging, overcurrent, or the like is detected in any of the single batteries 21. The detection of overcharging, etc. is carried out for each of the single batteries 21 or for the battery module 23 as a whole. To detect each of the single batteries 21, a battery voltage may be detected, or a positive electrode potential or a negative electrode potential may be detected. In the latter case, a lithium electrode used as a reference electrode is inserted into each of the single batteries 21. In the case of the battery pack 20 shown in FIGS. 4 and 5, wiring 35 for voltage detection is connected to each of the single batteries 21. A detection signal is sent to the protective circuit 26 through the wiring 35.

A protective sheet 36 made of rubber or a resin is arranged on each of three side surfaces of the battery module 23 but not on the side surface from which the negative electrode terminals 5 and the positive electrode terminals 6 protrude.

The battery module 23 is accommodated in a storage container 37, together with the protective sheets 36 and the printed wiring board 24. In other words, the protective sheet 36 is arranged on both of the inner side surfaces of the storage container 37 in a long side direction and one of the inner side surfaces of the storage container 37 in a short side direction, and the printed wiring board 24 is arranged on the other of the inner side surfaces in the short side direction. The battery module 23 is positioned in a space surrounded by the protective sheets 36 and the printed wiring board 24. A cover 38 is placed on the top of the storage container 37.

Instead of the adhesive tape 22, a heat-shrinkable tape may be used to fix the battery module 23. In this case, first the protective sheets are arranged on both side surfaces of the battery module, and the heat-shrinkable tape is wound around of the battery module, and then the heat-shrinkable tape is thermally shrunk to tie the battery module.

Although the single batteries 21 are connected in series in the example illustrated in FIGS. 4 and 5, they may be connected in parallel to increase their battery capacity. The assembled battery packs may be connected in series and/or in parallel.

Further, the design of the battery pack according to the second embodiment may be changed as appropriate depending on how it is used. The battery pack according to the second embodiment is preferably used for a use that requires good cycle performance under large current performance. Specific examples of uses are: a power supply of a digital camera, and an on-board power supply used for vehicles, such as two-wheeled to four-wheeled hybrid electric vehicles, two-wheeled to four-wheeled electric vehicles, and motor-assisted bicycles. The battery pack according to the second embodiment is particularly preferable for an on-board power supply used for vehicles.

Since the battery pack according to the second embodiment includes the nonaqueous electrolyte battery according to the first embodiment, it has low resistance.

EXAMPLES

Hereinafter, the above embodiments will be described in more detail based on examples.

Example 1

In Example 1, a nonaqueous electrolyte battery of Example 1 was produced by the following procedure.
<Preparation of Positive Electrode>
$LiNi_{0.33}Co_{0.33}Mn_{0.33}O_2$ as a positive electrode active material, carbon black as a conductive agent, and polyvinylidene fluoride as a binder were prepared. These were mixed at a weight ratio of 90:5:5 to obtain a mixture.

Next, the resultant mixture was dispersed in n-methylpyrrolidone (NMP) solvent to prepare a slurry. The obtained slurry was applied to an aluminum foil having a thickness of 20 μm, and dried. Next, the dried coating layer was pressed to obtain a positive electrode.
<Preparation of Negative Electrode>
$Li_4Ti_5O_{12}$ as a negative electrode active material, carbon black as a conductive agent, and polyvinylidene fluoride having a molecular weight of 550,000 as a binder were prepared. These were mixed at a weight ratio of 90:5:5 to obtain a mixture. When the negative electrode mixture layer was set to 100 parts by weight, the mixing ratio of polyvinylidene fluoride was 5 parts by weight.

Next, the resultant mixture was dispersed in n-methylpyrrolidone (NMP) solvent to prepare a slurry. The obtained slurry was applied to an aluminum foil having a thickness of 20 μm, and dried. Next, the dried coating layer was pressed. Thereafter, drying was carried out at 100° C. to obtain a negative electrode.
<Assembling of Batteries>
The positive electrode produced as described above, a separator made of the polyethylene-made porous film having a thickness of 20 μm, the negative electrode produced as described above, and another separator of the same were laminated in this order. The obtained laminate was spirally wound so that the negative electrode was positioned at the outermost periphery to prepare an electrode group. This was pressed to obtain a flat electrode group. This flat electrode group was inserted into a can-shaped container made of aluminum having a plate thickness of 0.3 mm and sealed with a lid (sealing plate). In this manner, a flat nonaqueous electrolyte secondary battery having a thickness of 5 mm, a width of 30 mm, a height of 25 mm, and a weight of 10 g was produced. The rated capacity of the battery was 250 mAh.

<Preparation of Nonaqueous Electrolyte>

Ethylene carbonate (EC) and ethyl methyl carbonate (EMC) were mixed at a volume ratio of 1:2 to prepare a mixed solvent. Lithium hexafluorophosphate (LiPF$_6$) was dissolved in the mixed solvent at a concentration of 1 mol/L. In addition, 10,000 ppm of lithium difluorophosphate (LiPO$_2$F$_2$) was added as an additive to the mixed solvent to prepare a nonaqueous electrolyte.

<Preparation of Battery>

A nonaqueous electrolyte was injected into an outer can accommodating the electrode group obtained as described above from a liquid inlet provided on the surface of the outer can. Next, a nonaqueous electrolyte battery was produced by sealing the liquid inlet.

<Measurement of Battery Capacity>

The obtained battery was charged at a constant current in an environment of 25° C. until the battery voltage reached 2.8 V at 20 mA, and then charged at a constant voltage until the charging current reached 5 mA. Subsequently, the battery was discharged at 20 mA until the battery voltage reached 1.5 V. When the battery capacity at this time was checked, the obtained battery capacity was 250 mAh.

<Photoelectron Spectrometry Measurement>

Using the nonaqueous electrolyte battery obtained as described above, XPS measurement was carried out as described above. From the peak obtained by fitting the measured XPS spectrum, P2/P1 was calculated. In the nonaqueous electrolyte battery of Example 1, P2/P1 was 0.2.

Of the F on the negative electrode surface obtained from the areas of the two peaks, the proportion of F contained in LiF was 10%.

Manufacture conditions, P2/P1 obtained by XPS measurement, and the proportion of LiF on the negative electrode surface in the examples and comparative examples are summarized in Table 1 below.

TABLE 1

| | Negative electrode active material | Molecular weight of PVdF | Temperature for drying (° C.) | Additive to nonaqueous electrolyte Additive | Added amount (ppm) | Result of XPS measurement on negative electrode surface P2/P1 | Proportion of LiF (%) |
|---|---|---|---|---|---|---|---|
| Example 1 | Li$_4$Ti$_5$O$_{12}$ | 550,000 | 100 | LiPO$_2$F$_2$ | 10000 | 0.28 | 14 |
| Example 2 | Li$_4$Ti$_5$O$_{12}$ | 550,000 | 100 | LiPO$_2$F$_2$ | 1000 | 0.38 | 19 |
| Example 3 | Li$_4$Ti$_5$O$_{12}$ | 550,000 | 100 | LiPO$_2$F$_2$ | 5000 | 0.3 | 15 |
| Example 4 | Li$_4$Ti$_5$O$_{12}$ | 550,000 | 100 | LiPO$_2$F$_2$ | 20000 | 0.25 | 12.5 |
| Example 5 | Li$_4$Ti$_5$O$_{12}$ | 550,000 | 100 | LiPO$_2$F$_2$ | 30000 | 0.22 | 10 |
| Example 6 | TiO$_2$ | 550,000 | 100 | LiPO$_2$F$_2$ | 10000 | 0.26 | 13 |
| Example 7 | TiO$_2$ | 550,000 | 100 | LiPO$_2$F$_2$ | 1000 | 0.28 | 14 |
| Example 8 | Li$_4$Ti$_5$O$_{12}$ | 400,000 | 100 | LiPO$_2$F$_2$ | 10000 | 0.3 | 15 |
| Example 9 | Li$_4$Ti$_5$O$_{12}$ | 700,000 | 100 | LiPO$_2$F$_2$ | 10000 | 0.26 | 13 |
| Example 10 | Li$_4$Ti$_5$O$_{12}$ | 550,000 | 100 | Li$_2$PO$_2$F | 10000 | 0.3 | 15 |
| Example 11 | Li$_4$Ti$_5$O$_{12}$ | 550,000 | 100 | KPO$_2$F$_2$ | 10000 | 0.32 | 17 |
| Example 12 | Li$_4$Ti$_5$O$_{12}$ | 550,000 | 100 | NaPO$_2$F$_2$ | 10000 | 0.34 | 18 |
| Comparative Example 1 | Li$_4$Ti$_5$O$_{12}$ | 550,000 | 130 | LiPO$_2$F$_2$ | 10000 | 0.79 | 40 |
| Comparative Example 2 | Li$_4$Ti$_5$O$_{12}$ | 2,000,000 | 100 | LiPO$_2$F$_2$ | 10000 | 0.25 | 12.5 |
| Comparative Example 3 | Li$_4$Ti$_5$O$_{12}$ | 550,000 | 100 | — | — | 0.6 | 30 |
| Comparative Example 4 | Li$_4$Ti$_5$O$_{12}$ | 2,000,000 | 100 | — | — | 0.45 | 22.5 |
| Comparative Example 5 | Li$_4$Ti$_5$O$_{12}$ | 550,000 | 70 | LiPO$_2$F$_2$ | 10000 | 0.75 | 37.5 |
| Comparative Example 6 | Li$_4$Ti$_5$O$_{12}$ | 2,000,000 | 70 | LiPO$_2$F$_2$ | 10000 | 0.73 | 36.5 |
| Comparative Example 7 | Li$_4$Ti$_5$O$_{12}$ | 550,000 | 70 | — | — | 0.82 | 41 |
| Comparative Example 8 | Li$_4$Ti$_5$O$_{12}$ | 2,000,000 | 70 | — | — | 0.78 | 39 |

Example 2

A nonaqueous electrolyte battery was prepared in the same manner as in Example 1 except that the amount of lithium difluorophosphate added to the nonaqueous electrolyte was 1000 ppm.

Example 3

A nonaqueous electrolyte battery was prepared in the same manner as in Example 1 except that the amount of lithium difluorophosphate added to the nonaqueous electrolyte was 5000 ppm.

Example 4

A nonaqueous electrolyte battery was prepared in the same manner as in Example 1 except that the amount of lithium difluorophosphate added to the nonaqueous electrolyte was 20,000 ppm.

Example 5

A nonaqueous electrolyte battery was prepared in the same manner as in Example 1 except that the amount of lithium difluorophosphate added to the nonaqueous electrolyte was 30,000 ppm.

Example 6

A nonaqueous electrolyte battery was prepared in the same manner as in Example 1 except that the negative electrode active material was monoclinic $TiO_2$.

Example 7

A nonaqueous electrolyte battery was prepared in the same manner as in Example 6 except that the amount of lithium difluorophosphate added to the nonaqueous electrolyte was 1000 ppm.

Example 8

A nonaqueous electrolyte battery was produced in the same manner as in Example 1 except that polyvinylidene fluoride having a molecular weight of 400,000 was used as a binder in the negative electrode.

Example 9

A nonaqueous electrolyte battery was prepared in the same manner as in Example 1 except that polyvinylidene fluoride having a molecular weight of 700,000 was used as a binder in the negative electrode.

Example 10

A nonaqueous electrolyte battery was prepared in the same manner as in Example 1 except that the additive to the nonaqueous electrolyte was lithium monofluorophosphate having an addition amount of 10,000 ppm.

Example 11

A nonaqueous electrolyte battery was prepared in the same manner as in Example 1 except that the additive to the nonaqueous electrolyte was changed to potassium difluorophosphate having an addition amount of 10,000 ppm.

Example 12

A nonaqueous electrolyte battery was prepared in the same manner as in Example 1 except that the additive to the nonaqueous electrolyte was sodium difluorophosphate having an addition amount of 10,000 ppm.

Comparative Example 1

A nonaqueous electrolyte battery was prepared in the same manner as in Example 1 except that the negative electrode drying temperature was 130° C.

Comparative Example 2

A nonaqueous electrolyte battery was prepared in the same manner as in Example 1 except that polyvinylidene fluoride having a molecular weight of 2,000,000 was used as a binder in the negative electrode.

Comparative Example 3

A nonaqueous electrolyte battery was prepared in the same manner as in Example 1 except that neither the difluorophosphate nor the monofluorophosphate was added.

Comparative Example 4

A nonaqueous electrolyte battery was prepared in the same manner as in Comparative Example 3 except that polyvinylidene fluoride having a molecular weight of 2,000,000 was used as a binder in the negative electrode.

Comparative Example 5

A nonaqueous electrolyte battery was prepared in the same manner as in Example 1 except that the negative electrode drying temperature was 70° C.

Comparative Example 6

A nonaqueous electrolyte battery was prepared in the same manner as in Comparative Example 5 except that polyvinylidene fluoride having a molecular weight of 2,000,000 was used as a binder in the negative electrode.

Comparative Example 7

A nonaqueous electrolyte battery was prepared in the same manner as in Comparative Example 5 except that neither the difluorophosphate nor the monofluorophosphate was added.

Comparative Example 8

A nonaqueous electrolyte battery was prepared in the same manner as in Comparative Example 7 except that polyvinylidene fluoride having a molecular weight of 2,000,000 was used as a binder in the negative electrode.

<Measurement of Battery Resistance>

A battery resistance of each of the nonaqueous electrolyte batteries of Examples 1 to 12 and the nonaqueous electrolyte batteries of Comparative Examples 1 to 8 was evaluated in the following manner.

First, each of the nonaqueous electrolyte batteries was charged in an environment of 25° C. at a constant current of 20 mA until the battery voltage reached 2.8 V. Next, the battery was charged at a constant voltage until the charge capacity reached 5 mAh. Subsequently, the battery was discharged at 20 mA until the battery voltage reached 1.5 V. Thereafter, the battery was charged at a constant current until the battery state of charge (SOC) reached 50%, and charged at a constant voltage until the charging capacity reached 5 mAh. The resistance of the battery at this time was measured and determined as the resistance value of each nonaqueous electrolyte battery.

<Evaluation of Amount of Gas Generated>

An amount of gas generated was evaluated in the following manner for each of the nonaqueous electrolyte batteries of Examples 1 to 12 and the nonaqueous electrolyte batteries of Comparative Examples 1 to 8.

First, each of the nonaqueous electrolyte batteries was charged in an environment of 25° C. at a constant current of 20 mA until the battery voltage reached 2.8 V. Next, the battery was charged at a constant voltage until the charge capacity reached 5 mAh.

Each of the batteries thus charged was stored under an environment of 55° C. for 48 hours.

After the storing, each battery was charged or discharged as appropriate for adjustment so that the state of charge (SOC) became 50%. For a battery adjusted to 50% SOC, a caliper was placed on the center of the battery in an environment of 25° C. to measure the thickness.

Based on the measured thickness, the battery size after storage was calculated. The calculated size of the battery after being stored and the size of the battery immediately after being produced were compared, and an amount of battery swelling was determined. Specifically, an amount of battery swelling was determined by comparing the battery thickness after being stored with a thickness of the battery immediately after being produced, which was taken as 100%. As described above, the size of the battery immediately after being produced (dimensions of the outer can) is 5 mm in thickness, 30 mm in width, and 25 mm in height.

The resistance values and amounts of gas generated obtained for the nonaqueous electrolyte batteries of Examples 1 to 12 and the nonaqueous electrolyte batteries of Comparative Examples 1 to 8 are summarized in Table 2 below.

TABLE 2

|  | Resistance (mOhm) | Amount of battery swell after being stored (%) |
|---|---|---|
| Example 1 | 50 | 120 |
| Example 2 | 60 | 140 |
| Example 3 | 53 | 130 |
| Example 4 | 48 | 112 |
| Example 5 | 45 | 110 |
| Example 6 | 50 | 138 |
| Example 7 | 60 | 140 |
| Example 8 | 55 | 130 |
| Example 9 | 45 | 115 |
| Example 10 | 58 | 145 |
| Example 11 | 60 | 125 |
| Example 12 | 63 | 125 |
| Comparative Example 1 | 200 | 165 |
| Comparative Example 2 | 130 | 130 |
| Comparative Example 3 | 180 | 230 |
| Comparative Example 4 | 140 | 200 |
| Comparative Example 5 | 140 | 250 |
| Comparative Example 6 | 180 | 230 |
| Comparative Example 7 | 150 | 320 |
| Comparative Example 8 | 200 | 300 |

As shown in Table 1, in any of the nonaqueous electrolyte batteries of Examples 1 to 12, the value of P2/P1 obtained by performing XPS measurement on the surface of the negative electrode was in the range of 0.1 to 0.4 inclusive. In each case, the proportion of F contained in LiF among F on the negative electrode surface was 20% or less. As shown in Table 2, the battery resistance value of each of the nonaqueous electrolyte batteries of Examples 1 to 12 was 100 mOhm or lower, and the amount of battery swell after the batteries were stored was suppressed to 150% or less.

In contrast, in the nonaqueous electrolyte batteries of Comparative Examples 1 and 3 to 8, the value of P2/P1 exceeded 0.4, and the proportion of LiF on the surface of the negative electrode also exceeded 20%. In these nonaqueous electrolyte batteries, the resistance value was high and the amount of battery swell was large as shown in Table 2. In the nonaqueous electrolyte battery of Comparative Example 2, although the proportion of LiF on the surface of the negative electrode and the amount of battery swell were similar to those of Examples 1 to 12, the resistance value was high.

Specifically, in the nonaqueous electrolyte battery of Comparative Example 1, the resistance value was higher than those of Examples 1 to 12, and the amount of battery swelling after being stored was as large as 165%. In Comparative Example 1, although it was possible to remove most of the moisture in the negative electrode by drying at high temperature, it is considered that the pyrolysis of PVdF had advanced further. Furthermore, it is considered that moisture which could not be removed even by high-temperature drying reacted with PVdF decomposition products, and excessive LiF was produced, thereby increasing resistance.

In the nonaqueous electrolyte secondary battery of Comparative Example 2, the value of P2/P1 on the negative electrode surface and the proportion of LiF to F present on the negative electrode surface were almost the same as those of Examples 1 to 12. It is considered that pyrolysis was suppressed by using PVdF having a molecular weight of 2,000,000 and the amount of decomposition products produced was thereby small; as a result, the formation of LiF was suppressed. On the other hand, the resistance value was as high as 130 mOhm. This is probably because PVdF having a large molecular weight acts as a resistance component, and the resistance value of the battery was increased in Comparative Example 2.

In the nonaqueous electrolyte secondary battery of Comparative Example 3, the resistance value was high and the amount of battery swelling after being stored was as large as 230%. In Comparative Example 3, since difluorophosphate was not added, the amount of LiF formed was increased due to residual moisture in the negative electrode; as a result, it is considered that the battery resistance was increased. It is further considered that gas generation was expedited by electrolysis of residual moisture, and an amount of gas generated was increased, and as a result, the amount of battery swelling increased.

In the nonaqueous electrolyte secondary battery of Comparative Example 4, the resistance value was high and the amount of battery swelling after being stored was as large as 200%. The resistance value in Comparative Example 4 was somewhat lower than in Comparative Example 3, although no difluorophosphate was added, similarly to Comparative Example 3. This is probably because only a small amount of pyrolysis product was produced by using PVdF having a molecular weight of 2,000,000 in Comparative Example 4, and as a result, the amount of LiF produced was relatively small. Nevertheless, it is considered that the resistance value in Comparative Example 4 was higher than the resistance values in Examples 1 to 12 because PVdF having a high molecular weight becomes a resistance component, similarly to Comparative Example 2.

In the nonaqueous electrolyte secondary battery of Comparative Example 5, the resistance value was high and the amount of battery swelling after being stored was as large as 250%. In Comparative Example 5, it is considered that an amount of pyrolysis of PVdF is small since the negative electrode was dried at a low temperature. It is considered, on the other hand, that insufficient drying led to a larger amount of residual moisture, and an amount of LiF produced due to the residual moisture was increased regardless of addition of difluorophosphate, thereby increasing the battery resistance. It is further considered that gas generation was expedited by electrolysis of the residual moisture, and an amount of gas generated was increased, and as a result, the amount of battery swelling increased.

In the nonaqueous electrolyte secondary battery of Comparative Example 6, the resistance value was high and the amount of battery swelling after being stored was as large as 230%. This is probably because, similarly to the nonaqueous electrolyte battery in Comparative Example 5, an amount of the residual moisture was large as a result of drying the negative electrode at a low temperature in Comparative Example 6, despite a small amount of pyrolysis of PVdF. Furthermore, it is considered that the resistance value became higher because PVdF having a high molecular weight was used in Comparative Example 6.

In the nonaqueous electrolyte secondary battery of Comparative Example 7, the resistance was high and the amount of battery swelling after being stored was as large as 320%. In Comparative Example 7, it is considered that an amount of residual moisture in the negative electrode was remarkably large because difluorophosphate was not added to the nonaqueous electrolyte in addition to the low temperature for drying the negative electrode. It is considered that the battery resistance was increased and the battery swelling amount was also increased as a result of increase in an amount of LiF produced and amount of gas generated due to the large amount of residual moisture.

In the nonaqueous electrolyte secondary battery of Comparative Example 8, the resistance was high and the amount of battery swelling after being stored was as large as 300%.

It is considered, similarly to the nonaqueous electrolyte battery of Comparative Example 7, that the high resistance and the large amount of battery swelling are due to the low temperature for drying the negative electrode and no addition of difluorophosphate in Comparative Example 8. Furthermore, it is considered that the resistance value became higher because PVdF having a high molecular weight was used in Comparative Example 8.

Example 13

A nonaqueous electrolyte battery was prepared in the same manner as in Example 1 except that the additive to the nonaqueous electrolyte was lithium monofluorophosphate having an addition amount of 1000 ppm.

Example 14

A nonaqueous electrolyte battery was prepared in the same manner as in Example 1 except that the additive to the nonaqueous electrolyte was lithium monofluorophosphate having an addition amount of 30,000 ppm.

Example 15

A nonaqueous electrolyte battery was prepared in the same manner as in Example 1 except that the additive to the nonaqueous electrolyte was sodium difluorophosphate having an addition amount of 1000 ppm.

Example 16

A nonaqueous electrolyte battery was prepared in the same manner as in Example 5 except that the temperature to dry the negative electrode was changed to 110° C.

Example 17

A nonaqueous electrolyte battery was prepared in the same manner as in Example 1 except that the additive to the nonaqueous electrolyte was lithium monofluorophosphate having an addition amount of 5000 ppm and lithium difluorophosphate having an addition amount of 5000 ppm. For the nonaqueous electrolyte batteries of Examples 13 to 17, the XPS measurement, the battery resistance measurement, and the gas generation amount measurement were performed under the same conditions as the conditions for performing those measurements on Examples 1 to 12, and the results are shown in Table 3 and Table 4 below.

TABLE 3

| | Negative electrode active material | Molecular weight of PVdF | Temperature for drying (° C.) | Additive to nonaqueous electrolyte Additive | Added amount (ppm) | Result of XPS measurement on negative electrode surface P2/P1 | Proportion of LiF (%) |
|---|---|---|---|---|---|---|---|
| Example 13 | $Li_4Ti_5O_{12}$ | 550,000 | 100 | $Li_2PO_3F$ | 1000 | 0.38 | 20 |
| Example 14 | $Li_4Ti_5O_{12}$ | 550,000 | 100 | $Li_2PO_3F$ | 30000 | 0.25 | 14 |
| Example 15 | $Li_4Ti_5O_{12}$ | 550,000 | 100 | $NaPO_2F_2$ | 1000 | 0.4 | 20 |
| Example 16 | $Li_4Ti_5O_{12}$ | 550,000 | 110 | $LiPO_2F_2$ | 30000 | 0.18 | 10 |
| Example 17 | $Li_4Ti_5O_{12}$ | 550,000 | 100 | $LiPO_2F_2$ $Li_2PO_3F$ | 5000 5000 | 0.32 | 16 |

TABLE 4

| | Resistance (mOhm) | Amount of battery swell after being stored (%) |
|---|---|---|
| Example 13 | 68 | 130 |
| Example 14 | 45 | 110 |
| Example 15 | 71 | 130 |
| Example 16 | 32 | 110 |
| Example 17 | 60 | 125 |

As shown in Table 3, in any of the nonaqueous electrolyte batteries of Examples 13 to 17, the value of P2/P1 obtained by performing XPS measurement on the surface of the negative electrode was in the range of 0.1 to 0.4. In each case, the proportion of F contained in LiF among F on the negative electrode surface was 20% or less. As shown in Table 4, the battery resistance value of each of the nonaqueous electrolyte batteries of Examples 13 to 17 was 100 mOhm or lower, and the amount of battery swell after the batteries were stored was suppressed to 150% or less.

A nonaqueous electrolyte battery according to at least one of the embodiments and examples described above includes: a positive electrode; a negative electrode containing monoclinic titanium dioxide or $Li_{4+a}Ti_5O_{12}$ (−0.5≤a≤3) as an active material, and polyvinylidene fluoride having a molecular weight of 400,000 to 1,000,000 inclusive, as a binder, the negative electrode satisfying a relationship of $0.1 \leq (P2/P1) \leq 0.4$; and a nonaqueous electrolyte containing at least one of difluorophosphate and monofluorophosphate. Here, in a spectrum obtained by photoelectron spectrometry performed on the surface of the negative electrode, P1 is an intensity of a peak that appears within the range of 689 to 685 eV, and P2 is an intensity of a peak that appears within the range of 684 to 680 eV. In such a nonaqueous electrolyte battery, suppression of gas generation and low resistance are compatible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A nonaqueous electrolyte battery comprising:
a positive electrode;
a negative electrode containing monoclinic titanium dioxide or $Li_{4+a}Ti_5O_{12}$ (here, $-0.5 \leq a \leq 3$) as an active material, and polyvinylidene fluoride with a molecular weight of 400,000 to 1,000,000 as a binder, the negative electrode satisfying a formula (I) below; and
a nonaqueous electrolyte containing at least one of difluorophosphate and monofluorophosphate, $$0.1 \leq (P2/P1) \leq 0.4 \tag{I}$$

wherein P1 is an intensity of a peak that appears within a range of 689 to 685 eV in a spectrum according to photoelectron spectrometry of a surface of the negative electrode, and P2 is an intensity of a peak that appears within a range of 684 to 680 eV in the spectrum.

2. The nonaqueous electrolyte battery according to claim 1, wherein a mass concentration of the difluorophosphate or monofluorophosphate with respect to a mass of the nonaqueous electrolyte is in the range from 1000 ppm to 30,000 ppm.

3. The nonaqueous electrolyte battery according to claim 1, wherein a proportion of F included in LiF to F present on the surface of the negative electrode is 20% or less.

4. The nonaqueous electrolyte battery according to claim 1, wherein the polyvinylidene fluoride has a molecular weight of 400,000 to 700,000.

5. The nonaqueous electrolyte battery according to claim 1, wherein a mixing ratio of the polyvinylidene fluoride is 5 parts by weight or less when the negative electrode is 100 parts by weight.

6. A battery pack comprising one or more nonaqueous electrolyte batteries according to claim 1.

7. The battery pack according to claim 6, further comprising an external terminal for distributing power.

* * * * *